United States Patent
Sakata et al.

(10) Patent No.: US 8,766,913 B2
(45) Date of Patent: Jul. 1, 2014

(54) TELEPHONE BOOK DATA PROCESSOR

(75) Inventors: Ryuji Sakata, Kariya (JP); Soichi Saito, Nagoya (JP); Suguru Matsushita, Obu (JP); Shinichi Yamamoto, Toyota (JP); Kazushige Hayashi, Toyota (JP); Masao Sasaki, Okazaki (JP)

(73) Assignees: Denso Corporation, Kariya (JP); Toyota Jidosha Kabushiki Kaisha, Toyota (JP)

(*) Notice: Subject to any disclaimer, the term of this patent is extended or adjusted under 35 U.S.C. 154(b) by 255 days.

(21) Appl. No.: 13/347,130

(22) Filed: Jan. 10, 2012

(65) Prior Publication Data

US 2012/0176307 A1 Jul. 12, 2012

(30) Foreign Application Priority Data

Jan. 12, 2011 (JP) ................................ 2011-003817

(51) Int. Cl.
*G09G 5/00* (2006.01)
*G06F 3/0488* (2013.01)

(52) U.S. Cl.
CPC .................................. *G06F 3/04886* (2013.01)
USPC ........................... 345/156; 345/538; 345/565

(58) Field of Classification Search
CPC ............. G06F 3/0482; G06F 3/04886; G06F 17/30575; H04N 2005/441; H04M 1/274516; H04M 1/72519; H04M 2250/22
USPC ......... 345/156, 173, 538, 565; 455/41.1, 418, 455/567; 379/355.03
See application file for complete search history.

(56) References Cited

U.S. PATENT DOCUMENTS

| | | | |
|---|---|---|---|
| 7,020,498 B2* | 3/2006 | Muraki | 455/567 |
| 2003/0003968 A1* | 1/2003 | Muraki | 455/567 |
| 2003/0081758 A1* | 5/2003 | Kumar et al. | 379/355.03 |
| 2003/0114202 A1 | 6/2003 | Suh et al. | |
| 2004/0056837 A1* | 3/2004 | Koga et al. | 345/156 |
| 2006/0262103 A1* | 11/2006 | Hu et al. | 345/173 |

(Continued)

FOREIGN PATENT DOCUMENTS

| | | |
|---|---|---|
| DE | 102007047374 | 4/2008 |
| JP | 2000-322693 | 11/2000 |

(Continued)

OTHER PUBLICATIONS

U.S. Appl. No. 13/316,853, filed Dec. 12, 2011, Sakata et al.

(Continued)

*Primary Examiner* — Thuy Pardo
(74) *Attorney, Agent, or Firm* — Harness, Dickey & Pierce, PLC

(57) ABSTRACT

A telephone book data processor includes: a connection element for connecting to an external device via a short range communication manner to transfer a telephone book data; a telephone book data obtaining element for obtaining the telephone book data; a memory having multiple memory regions for storing the telephone book data; and a controller for executing a telephone book data transfer process and a telephone book data utilizing process. The controller defines one memory region as an object of the telephone book data transfer process and another memory region as an object of the telephone book data utilizing process. The controller executes the telephone book data utilizing process with using the telephone book data in the another memory region while the controller executes the telephone book data transfer process for storing a new telephone book data in the one memory region.

6 Claims, 6 Drawing Sheets

(56) References Cited

U.S. PATENT DOCUMENTS

| | | |
|---|---|---|
| 2008/0085745 A1 | 4/2008 | Ozaki |
| 2008/0231595 A1* | 9/2008 | Krantz et al. .................. 345/156 |
| 2009/0228194 A1 | 9/2009 | Imasaka et al. |
| 2010/0197362 A1 | 8/2010 | Saitoh et al. |
| 2010/0233957 A1* | 9/2010 | Dobosz ........................ 455/41.1 |
| 2010/0317401 A1* | 12/2010 | Lee et al. ....................... 455/557 |
| 2012/0176307 A1* | 7/2012 | Sakata et al. .................. 345/156 |
| 2013/0053016 A1* | 2/2013 | Rau et al. ...................... 455/418 |

FOREIGN PATENT DOCUMENTS

| | | |
|---|---|---|
| JP | 2008-005431 | 1/2008 |
| JP | 2008-252606 | 10/2008 |
| JP | 2010-245716 | 10/2010 |

OTHER PUBLICATIONS

U.S. Appl. No. 13/313,365, filed Dec. 7, 2011, Sakata et al.
Office Action dated Oct. 2, 2012 issued in corresponding German Application No. 102012200138.7 with English translation.
U.S. Appl. No. 13/200,158, filed Sep. 20, 2011, Matsushita et al.
Office Action issued Jan. 23, 2014 in corresponding CN Application No. 2012 1000 8562.1 (with English translation).
Office Action dated Jan. 14, 2014 issued in corresponding Japanese Application No. 2011-003817.

* cited by examiner

TELEPHONE BOOK DATA PROCESSOR

CROSS REFERENCE TO RELATED APPLICATION

This application is based on Japanese Patent Application No. 2011-3817 filed on Jan. 12, 2011, the disclosure of which is incorporated herein by reference.

TECHNICAL FIELD

The present invention relates to a telephone book data processor for obtaining telephone book data from an external device, which stores the telephone book data, and for storing the telephone book data therein.

BACKGROUND

JP-A-2003-198713 (corresponding to US Patent Application Publication No. 2003/0114202) teaches the following technique. When a user brings a cell phone having a short range wireless communication function in a compartment of a vehicle, the cell phone is capable of communicating with an in-vehicle device having a short range wireless communication function. In this case, the user can browse telephone book data stored in the cell phone when the user operates the in-vehicle device. A telephone book data transfer protocol is established between the cell phone and the in-vehicle device. The telephone book data transfer protocol defines a transfer method of the telephone book data. In the above manner, the telephone book data stored in the cell phone is transferred to the in-vehicle device.

Here, the in-vehicle device executes a telephone book data transfer process for obtaining the telephone book data transferred from the cell phone and storing the data. When the in-vehicle device executes the telephone book data transfer process, the in-vehicle device can not execute a telephone book data utilizing process for utilizing the telephone book data. Accordingly, when the telephone data is transferred from the cell phone to the in-vehicle device, the user can not browse the telephone book data, and the user can not make a phone call with using the telephone book data. Further, the user can not recognize information about an incoming caller with using the telephone book data even when the cell phone receives an incoming call. The information about the incoming caller includes, for example, a name of the incoming caller. Thus, operability of a system of the in-vehicle device and the cell phone is low.

SUMMARY

In view of the above-described problem, it is an object of the present disclosure to provide a telephone book data processor for obtaining telephone book data from an external device, which stores the telephone book data, and for storing the telephone book data therein. The telephone book data processor has high operability. Specifically, even when the processor executes a telephone book data transfer process for obtaining and storing the telephone book data transferred from the external device, the processor can execute a telephone book data utilizing process for utilizing the telephone book data.

According to an aspect of the present disclosure, a telephone book data processor includes: a connection element for connecting to an external device via a short range communication manner so as to provide a telephone book data transfer protocol for transferring a telephone book data from the external device to the telephone book data processor; a telephone book data obtaining element for obtaining the telephone book data when the connection element is connected to the external device; a telephone book data memory for storing the telephone book data; and a controller for executing a telephone book data transfer process and a telephone book data utilizing process for utilizing the telephone book data in the telephone book data memory, wherein the controller controls the connection element to connect to the external device, controls the telephone book data obtaining element to obtain the telephone book data, and controls the telephone book data memory to store the telephone book data in the telephone book data transfer process. The telephone book data memory includes a plurality of telephone book data memory regions. Each of the plurality of telephone book data memory regions stores the telephone book data, which is transferred from the external device at one time. The controller defines one of the plurality of telephone book data memory regions as an object of the telephone book data transfer process and another one of the plurality of telephone book data memory regions as an object of the telephone book data utilizing process. The controller executes the telephone book data utilizing process with using the telephone book data stored in the another one of the plurality of telephone book data memory regions while the controller executes the telephone book data transfer process for storing a new telephone book data from the telephone book data obtaining element in the one of the plurality of telephone book data memory regions.

In the above processor, the controller can execute the telephone book data transfer process and the telephone book data utilizing process independently. Even when the processor executes the telephone book data transfer process for obtaining and storing the new telephone book data transferred from the external device, the processor can execute the telephone book data utilizing process for utilizing the telephone book data. Thus, the operability of the processor is improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
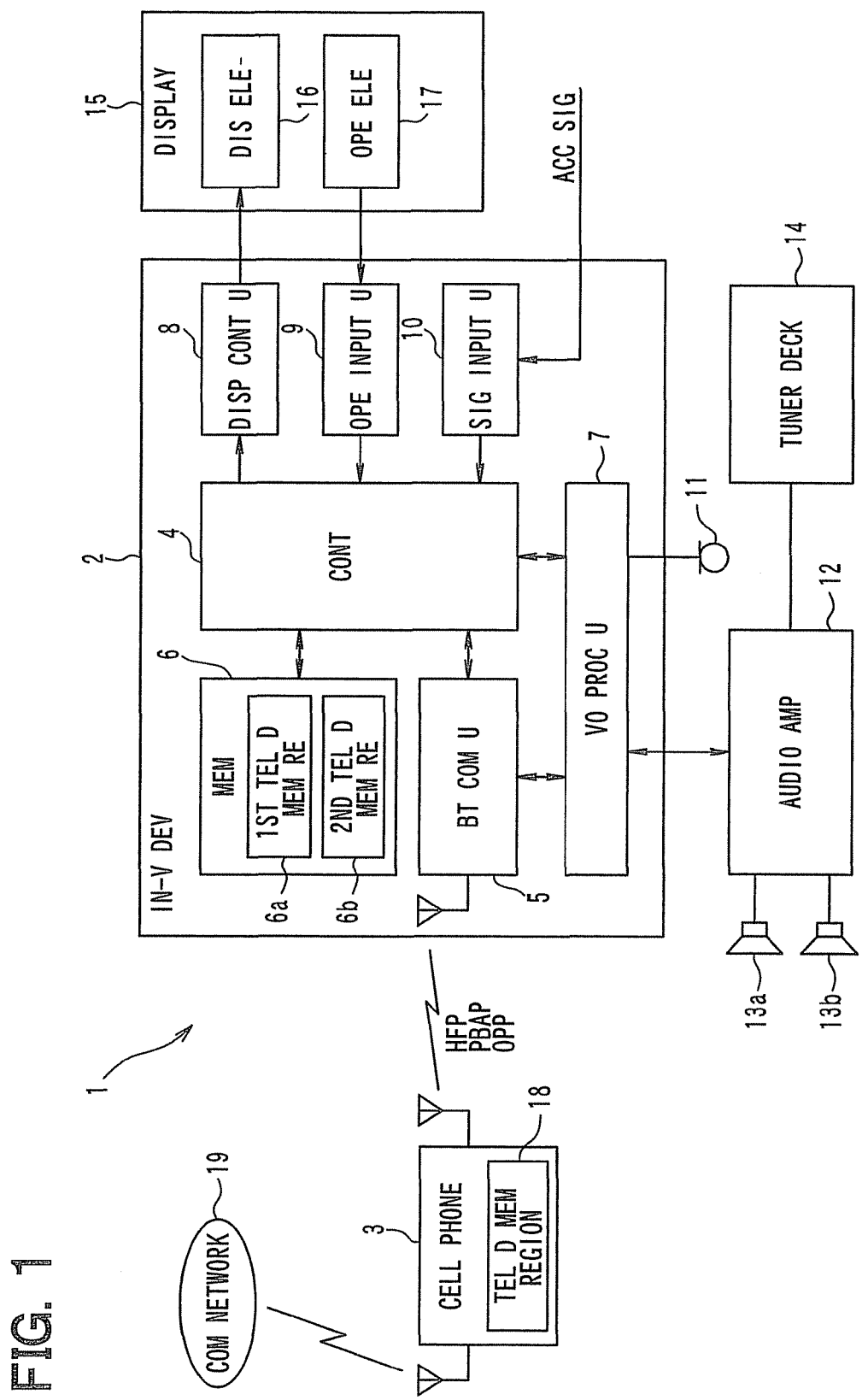
FIG. 1 is a block diagram showing a system for a telephone book data processor according to an example embodiment of the present disclosure.

A system for a telephone book processor according to an example embodiment will be explained with reference to drawings. Here, an in-vehicle device has a Bluetooth (i.e., BT as a registered trademark) communication function, which corresponds to a short range wireless communication function, so that the in-vehicle device communicates with a cell phone having the BT communication function. In this case, the in-vehicle device is arranged in a compartment of the vehicle, and the user brings the cell phone in the compartment.

The BT communication system 1 includes the in-vehicle device 2 mounted on the vehicle and the cell phone 3 brought into the compartment. The in-vehicle device 2 corresponds to a telephone book data processor, and the cell phone 3 corresponds to an external device. The in-vehicle device 2 includes a controller 4, a BT communication unit 5, a memory 6, a voice processing unit 7, a display control unit 8, an operation input unit 9 and a signal input unit 10. The controller 4 provides a controlling element and an in-coming call detection element. The BT communication unit 5 provides a connection element and a telephone book data obtaining element. The memory 6 provides a telephone book data memorizing element. The operation input unit 9 provides a browsing operation reception element and an outgoing call operation reception element.

The controller 4 is a micro computer having a CPU, a RAM, a ROM, an I/O bus and the like. The controller 4 controls a whole of operations such as a communication operation and a data management operation in the in-vehicle device 2. The BT communication unit 5 has the BT communication function with the cell phone 3. The BT communication unit 5 executes a multi-profile communication so that the unit 5 couples simultaneously with the external device through multiple profiles, which are defined by a BT communication standard. The multiple profiles includes a hands free profile (i.e., HFP) for defining hands free communication, a phone book access profile (i.e., PBAP) for defining telephone book data transfer, an object push profile (i.e., OPP) for defining various data transfer and the like. Each of the HFP, the PBAP and the OPP provides a communication protocol defined by a corresponding function.

The PBAP is a profile for defining pull-type telephone book data transfer. Under a condition that the BT communication unit 5 is coupled with the cell phone 3 via the PBAP, the telephone book data stored in the cell phone 3 is transferred from the cell phone to the in-vehicle device 2 when the user operates the in-vehicle device 2 without operating the cell phone 3. The OPP is a profile for defining a push-type telephone book data transfer. Under a condition that the BT communication unit 5 is coupled with the cell phone 3 via the OPP, the telephone book data stored in the cell phone 3 is not transferred from the cell phone to the in-vehicle device 2 unless the user operates both of the in-vehicle device 2 and the cell phone 3.

The memory 6 has multiple memory regions for storing various data. Specifically, the memory 6 includes a first telephone book data memory region 6a and a second telephone book data memory region 6b, each of which stores telephone book data transferred from the cell phone 3 and obtained by the BT communication unit 5. The telephone book data represents correspondence between a telephone number and a registered name and an electric mail address. Each of the first telephone book data memory region 6a and the second telephone book data memory region 6b provides a memory capacity for storing the telephone book data, which is transferred from the cell phone 3 at one time via the PBAP or the OPP. The memory 6 further includes an outgoing call record data memory region and an incoming call record data memory region. The outgoing call record data memory region stores outgoing call record data representing correspondence between an outgoing call telephone number and outgoing call time according to outgoing call operation from the in-vehicle device 2 and outgoing call operation from the cell phone, which connects to the in-vehicle device 2 via the HFP. The incoming call record data memory region stores incoming call record data representing correspondence between an incoming call telephone number and incoming call time according to incoming call operation from the cell phone, which connects to the in-vehicle device 2 via the HFP.

The voice processing unit 7 is connected to a microphone 11, which is arranged at a certain position in the compartment such as a position near a steering wheel so that the microphone 11 can easily catch sound output from the user. Further, the voice processing unit 7 is connected to an audio amplifier 12, which is arranged outside of the in-vehicle device 2. The audio amplifier 12 is connected to multiple speakers 13a, 13b.

The voice processing unit 7 processes the outgoing voice data and inputs the processed outgoing voice data into the BT communication unit 5 when the voice output from the user is input as an outgoing voice data via the microphone 11 under a condition that the BT communication unit 5 is coupled with the cell phone 3 via the HFP. Further, the voice processing unit 7 inputs the incoming voice data into the audio amplifier 12 when the incoming voice data is input from the BT communication unit 5 into the voice processing unit 7 under a condition that the BT communication unit 5 is coupled with the cell phone 3 via the HFP.

The audio amplifier 12 amplifies the incoming voice data and outputs the incoming voice sound via the speakers 13a, 13b when the incoming voice data is input into the audio amplifier 12 from the voice processing unit 7. Further, the audio amplifier 12 is connected to the tuner deck 14. When a music sound data played by the tuner deck 14 through a music memory medium and radio program data received from a radio station are input from the tuner deck 14 into the audio amplifier 12, the audio amplifier 12 amplifies the music sound data and the radio program data and outputs the music sound and the radio program via the speakers 13a, 13b.

The display 15 includes a display element 16 for displaying various screen images and an operation element 17 for providing a touch switch on the screen of the display element. The display element 16 provides a telephone book data display element, a caller information display element (i.e., a sender information display element), a receiver information undetermined screen display element and a receiver information determined screen display element. The display control unit 8 controls the display element 16 in the display device 15 to display an image according to the display instruction signal when a display instruction signal is input into the display control unit 8 from the controller 4. The operation input unit 9 outputs the operation detection signal to the controller 4 when the user operates the touch switch on the display screen of the display element 16 so that the operation detection signal is input from the operation element 17 into the operation input unit 9. Then, the controller 4 analyzes the operation detection signal from the operation input unit 9 so that the controller determines the operation of the user.

The signal input unit 10 is connected to an accessory switch (ACC SW), which is mounted on the vehicle. When the ACC signal is input from the ACC switch into the signal input unit 10, the signal input unit 10 outputs the ACC signal to the controller 4. Then, the controller 10 turns on and off a power source according to the ACC signal. Specifically, when the ACC signal is in an on-state, the controller 10 turns on the power source, and when the AC signal is in an off-state, the controller 10 turns off the power source. Specifically, the controller 4 turns on the power source when the ACC signal switches from the off-state to the on-state. Thus, the in-vehicle device 2 is activated. The controller 4 turns off the power source when the ACC signal switches from the on-state to the off-state. Thus, the in-vehicle device 2 stops operating.

The cell phone 3 includes a controlling unit for controlling a whole of operations in the cell phone 3, a telephone communication unit for executing a telephone communication with the communication network 19, a BT communication unit for executing a BT communication, a key input unit having various keypads that the user operates, a memory unit having a telephone book data memory region 18 for storing a telephone book data, a display unit for displaying various display screens, a microphone for inputting a voice output from the user, a speaker for outputting a voice as a receiving voice, which is received from a person at the other end of the line, and the like. In this case, the BT communication unit of the cell phone 3 has a function for executing the BT communication with the in-vehicle device 2. Similar to the BT communication unit 5 of the in-vehicle device 2, the BT communication unit of the cell phone 3 executes a multi-profile communication so that the unit couples simultaneously with another device through multiple profiles, which are defined by a BT communication standard. The multiple profiles include the HFP, the PBAP and the OPP. The communication network 19 includes facilities for providing a cell phone communication service such as a cell phone station and a station control apparatus.

In the above structure, each of the first telephone book data memory region 6a and the second telephone book data memory region 6b in the memory 6 has an identifier for specifying a respective memory region 6a, 6b. The controller 4 specifies the first telephone book data memory region 6a when the identifier is "1." The controller 4 specifies the second telephone book data memory region 6b when the identifier is "2." The controller 4 controls and manages each of the first telephone book data memory region 6a and the second telephone book data memory region 6b. For example, the controller 4 controls one of the first telephone book data memory region 6a and the second telephone book data memory region 6b as an object for the telephone book data transfer process, and controls the other of the first telephone book data memory region 6a and the second telephone book data memory region 6b as an object for the telephone book data utilizing process so that the controller 4 controls the first telephone book data memory region 6a and the second telephone book data memory region 6b, independently (i.e., exclusively).

Specifically, the controller 4 executes the telephone book data transfer process under a condition that the BT communication unit 5 is coupled with the cell phone 3 via the PBAP and/or the OPP so that the telephone book data transferred from the cell phone 3 and obtained by the BT communication unit 5 is stored in the one of the first telephone book data memory region 6a and the second telephone book data memory region 6b set as an object for the telephone book data transfer process. Further, the controller 4 executes the telephone book data utilizing process under a condition that the BT communication unit 5 is coupled with the cell phone 3 via the PBAP and/or the OPP so that the telephone book data stored in the other of the first telephone book data memory region 6a and the second telephone book data memory region 6b set as an object for the telephone book data utilizing process is utilized.

In the above case, the controller 4 can execute the telephone book data transfer process and the telephone book data utilizing process at the same time. Specifically, the controller 4 executes the telephone book data transfer process with using the one of the first telephone book data memory region 6a and the second telephone book data memory region 6b set as an object for the telephone book data transfer process, and further, executes the telephone book data utilizing process simultaneously with using the other of the first telephone book data memory region 6a and the second telephone book data memory region 6b set as an object for the telephone book data utilizing process.

Here, the telephone book data utilizing process includes: a process for displaying the telephone book data on the display element 16 when the user performs the browsing operation of the telephone book data through the operation element 17, the telephone book data stored in the other of the first telephone book data memory region 6a and the second telephone book data memory region 6b as the object for the telephone book data utilizing process; a process for making a call with using the telephone book data stored in the other of the first telephone book data memory region 6a and the second telephone book data memory region 6b as the object for the telephone book data utilizing process when the user performs a calling operation with utilizing the telephone book data through the operation device 17; and a process for displaying the caller information on the display element 17 based on the telephone book data stored in the other of the first telephone book data memory region 6a and the second telephone book data memory region 6b as the object for the telephone book data utilizing process when the incoming call to the cell phone 3 is detected.

Figure 2A:
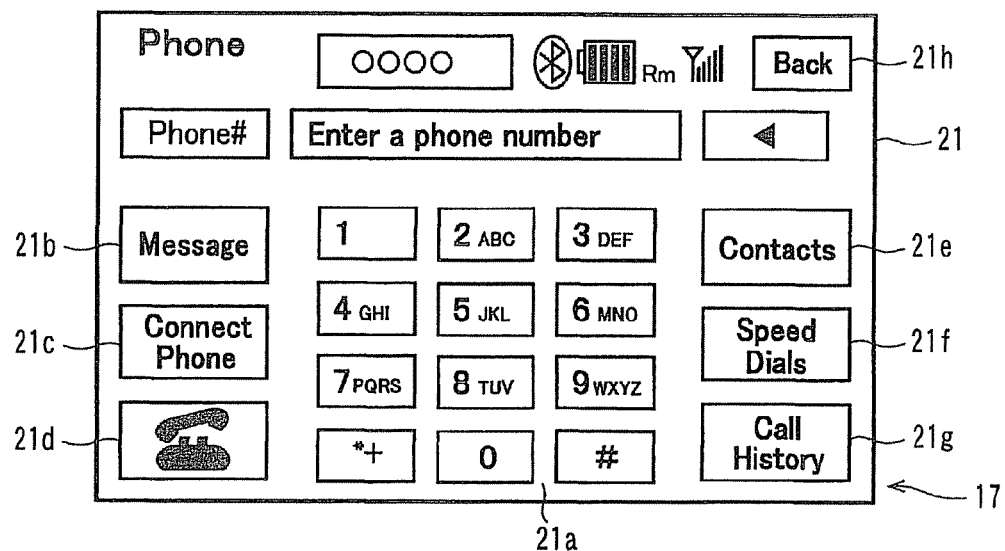
FIG. 2A is a diagram showing a telephone function screen image.
Figure 2B:
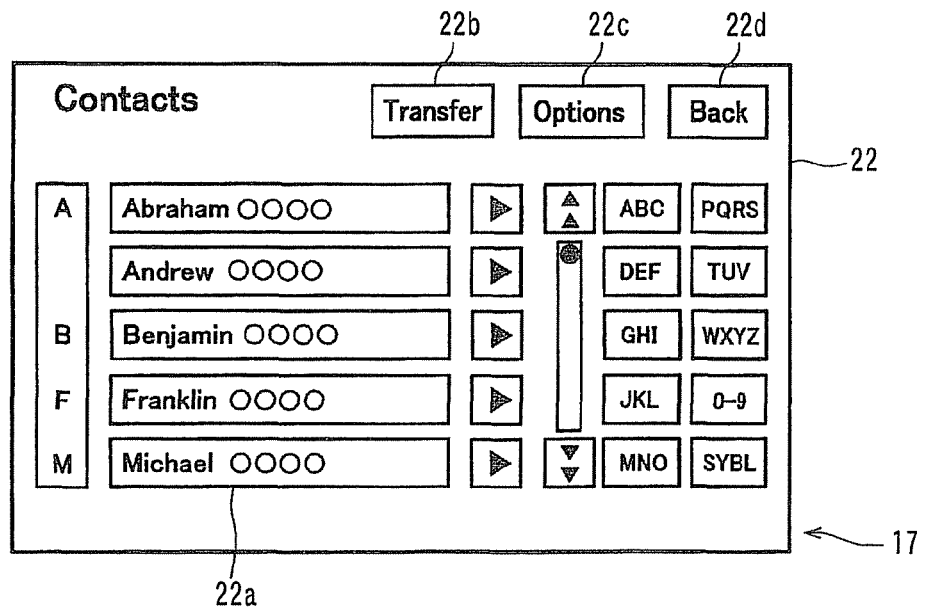
FIG. 2B is a diagram showing a telephone book data list screen image.
Figure 3A:
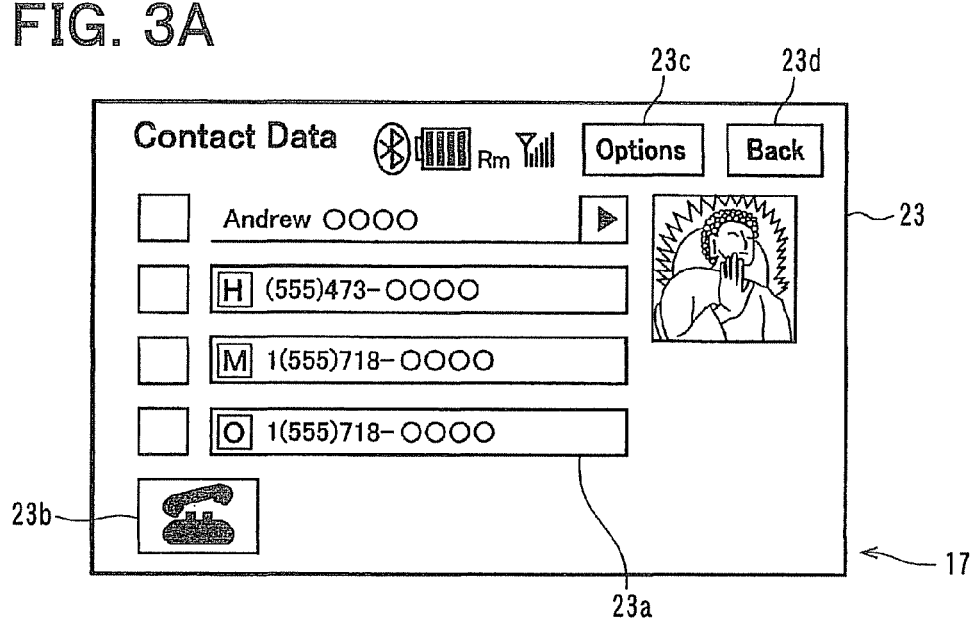
FIG. 3A is a diagram showing a telephone book data list selection screen image.
Figure 3B:
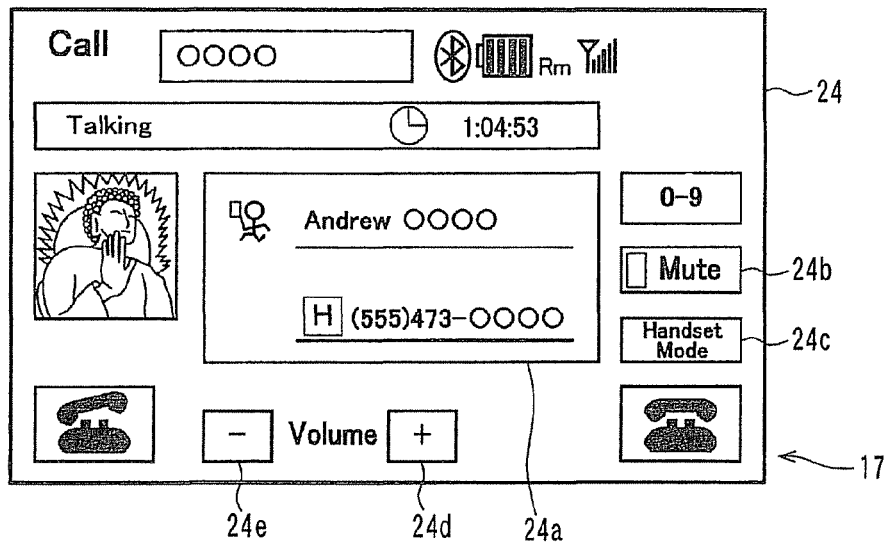
FIG. 3B is a diagram showing a busy line screen image.

The controller 4 controls the display element 17 to display a telephone function screen image 21 as a phone image shown in FIG. 2A, a telephone book data list screen image 22 as a contact image in FIG. 2B, a telephone book data list selection screen image 23 as a contact data image in FIG. 3A, and a busy line screen image 24 as a calling image in FIG. 3B. When the display element 17 displays the telephone function screen image 21 in FIG. 2A, and the user selects a contact keypad 21e, the display element 17 switches from the image 21 in FIG. 2A to the telephone book data list screen image 22 in FIG. 2B. When the display element 17 displays the telephone book data list screen image 22 in FIG. 2B, and the user selects one of the telephone numbers in the list, the display element 17 switches from the image 22 in FIG. 2B to the telephone book data list selection screen image 23 in FIG. 3A. When the display element 17 displays the telephone book data list selection screen image 23 in FIG. 3A, and the user selects the calling keypad 23b, the display element 17 switches from the image 23 in FIG. 3A to the busy line screen image 24 in FIG. 3B. Here, the telephone function screen image 21 and the telephone book data list screen image 22 correspond to an outgoing call receiver information undetermined screen image, which represents a state such that the user does not confirm the outgoing call receiver information (or the user is confirming the outgoing call receiver). The telephone book data list selection screen image 23 and the busy line screen image 24 correspond to an outgoing call receiver information determined screen image, which represents a state such that the user confirms the outgoing call receiver information.

When the controller 4 determines that the user selects the telephone function screen image in a menu screen image under a condition that the display element 17 displays the menu screen image (not shown), the controller 4 controls the display element 17 to display the telephone function screen image 21. The telephone function screen image 21 includes numerical keypads 21a representing from zero to nine, a message keypad 21b, a contact phone key pad 21c, a calling keypad 21*d*, a contact keypad 21*e*, a speed dials keypad 21*f*, a call history keypad 21*g*, a back keypad 21*h* and the like, which are touch keypads.

When the controller 4 determines that the user pushes the contact keypad 21*e* in the telephone function screen image 21 under a condition that the display element 17 displays the telephone function screen image 21, the controller 4 controls the display element 17 to display the telephone book data list screen image 22. The telephone book data list screen image 22 includes a list keypad 22*a*, a transfer keypad 22*b*, an option keypad 22*c*, a back keypad 22*d* and the like, which are touch keys for specifying one of the telephone book data as an object of the telephone book data utilizing process.

When the controller 4 determines that the user selects one of the telephone book data in the telephone book data list on the telephone book data list screen image 22 under a condition that the display element 17 displays the telephone book data list screen image 22, the controller 4 controls the display element 17 to display the telephone book data list selection screen image 23 corresponding to the selected one of the telephone book data. In FIG. 26, the user selects, for example, the telephone book data of Andrew. The telephone book data list selection screen image 23 includes a telephone number keypad 23*a* for specifying one of the telephone numbers corresponding to the elected one of the telephone book data, a calling keypad 23*b*, a option keypad 23*c*, a back keypad 23*d* and the like, which are touch keys.

When the controller 4 determines that the user pushes the calling keypad 23*b* on the telephone book data list selection screen image 23 under a condition that the display element 17 displays the telephone book data list selection screen image 23, the controller 4 controls the display element 17 to display a calling screen image (not shown). When the controller 4 determines that the outgoing receiver responds to the outgoing call, the controller 4 controls the display element 17 to display the busy line screen image 24. The busy line screen image 24 includes receiver information 24*a* (i.e., information about a person on the other end of the line) for specifying the selected one of the telephone book data, a mute keypad 24*b*, a handset mode keypad 24*c*, a plus keypad 24*d*, a minus keypad 24*e* and the like, which are touch keys.

Figure 4:
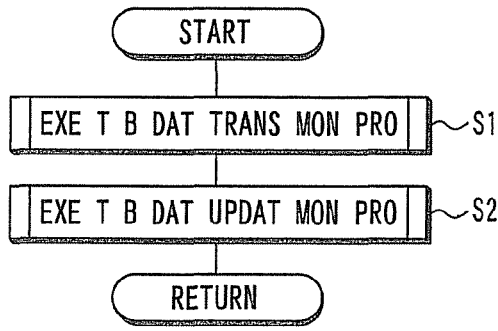
FIG. 4 is a flowchart showing a main process.
Figure 5:
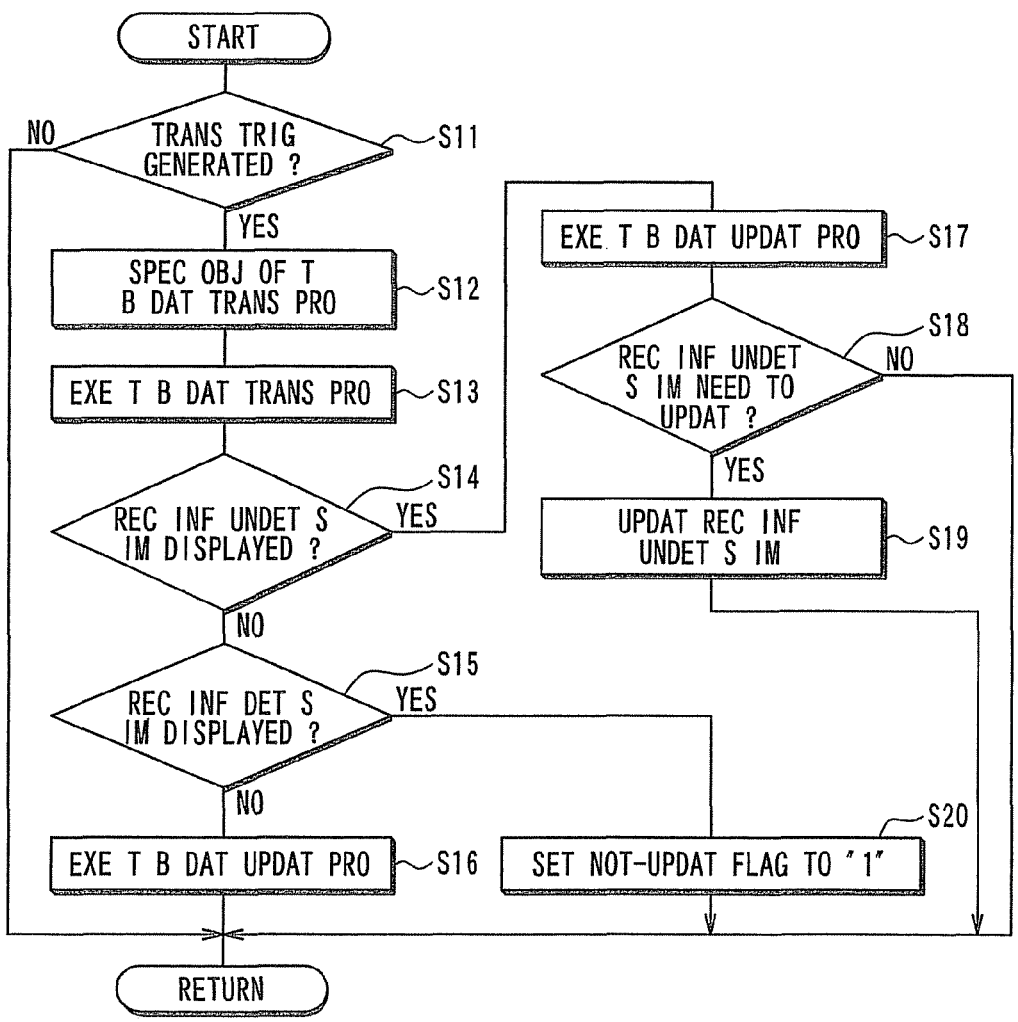
FIG. 5 is a flowchart showing a telephone book data transfer monitoring process.
Figure 6:
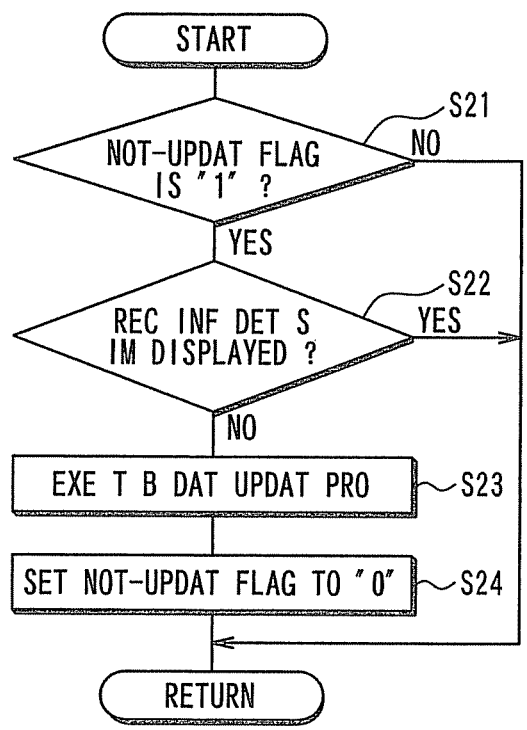
FIG. 6 is a flowchart showing a telephone book data update monitoring process.

Next, the advantage of the above construction will be explained with reference to FIGS. 4 to 7. FIGS. 4 to 6 are flowcharts of processes executed by the in-vehicle device 2. In this case, the BT communication unit 5 and the cell phone 3 are connected to each other via, for example, the PBAP.

The controller 4 executes a main process in FIG. 4 under a condition that a power source of the in-vehicle device 2 turns on, i.e., the ACC switch turns on. Further, the controller 4 executes a telephone book data transfer monitoring process in step S1 and a telephone book data update monitoring process in step S2, which are sub process of the main process. Specifically, the controller 4 periodically executes the telephone book data transfer monitoring process and the telephone book data update monitoring process with a predetermined cycle. Each of the telephone book data transfer monitoring process and the telephone book data update monitoring process will be explained in turn. Here, the controller 4 ends the main process when the power source of the in-vehicle device 2 turns off.

(1) Telephone Book Data Transfer Monitoring Process

The controller 4 starts to execute the telephone book data transfer monitoring process at certain time when the main process is moved to the telephone book data transfer monitoring process. When the controller 4 starts to execute the telephone book data transfer monitoring process, in step S11 of FIG. 5, the controller 4 determines whether a transfer trigger of transferring the telephone book data from the cell phone 3 to the in-vehicle device 2 is generated. When the controller 4 determines that the transfer trigger of transferring the telephone book data from the cell phone 3 to the in-vehicle device 2 is not generated, i.e., when the determination in step S11 is "NO," the controller 4 ends the telephone book data transfer monitoring process, and returns to the main process.

The controller 4 determines that the transfer trigger of transferring the telephone book data from the cell phone 3 to the in-vehicle device 2 is generated, i.e., the determination in step S11 is "YES," when the controller 4 detects that the user performs an operation for instructing data transfer of the telephone book data with using the operation element 17. When the determination in step S11 is "YES," it goes to step S12. In step S12, the controller 4 specifies one of the first telephone book data memory region 6*a* and the second telephone book data memory region 6*b* as an object of the telephone book data transfer process at that time. When the controller 4 specifies the one of the first telephone book data memory region 6*a* and the second telephone book data memory region 6*b* as an object of the telephone book data transfer process, it goes to step S13. In step S13, the controller 4 executes the telephone book data transfer process with respect to the one of the first telephone book data memory region 6*a* and the second telephone book data memory region 6*b* as an object of the telephone book data transfer process.

Specifically, the controller 4 stores the telephone book data, transferred from the cell phone 3 and obtained by the BT communication unit 5, in the one of the first telephone book data memory region 6*a* and the second telephone book data memory region 6*b* as an object of the telephone book data transfer process. In this case, as described above, while the controller 4 is storing the telephone book data, transferred from the cell phone 3 and obtained by the BT communication unit 5, in the one of the first telephone book data memory region 6*a* and the second telephone book data memory region 6*b* as an object of the telephone book data transfer process, the controller 4 can execute the telephone book data utilizing process for utilizing the other of the first telephone book data memory region 6*a* and the second telephone book data memory region 6*b* as an object for the telephone book data utilizing process, the other being not specified as the object of the telephone book data transfer process.

Next, when the controller 4 completes the telephone book data transfer process, the controller 4 determines in step S14 whether, at that time, the display element 16 displays the outgoing call receiver information undetermined screen image such as the telephone function screen image 21 and the telephone book data list screen image 22. Further, in step S15, the controller 4 determines whether, at that time, the display element 16 displays the outgoing call receiver information determined screen image such as the telephone book data list selection screen image 23 and the busy line screen image 24.

Here, when the controller 4 determines in steps S14 and S15 that the display element 16 does not display both of the outgoing call receiver information undetermined screen image and the outgoing call receiver information determined screen image at the time just after the controller 4 completes the telephone book data transfer process, i.e., when the determinations in steps S14 and S15 are "NO," it goes to step S16. In step S16, the controller 4 a telephone book data update process for updating the telephone book data. Then, the controller 4 completes the telephone book data transfer monitoring process, and returns to the main process. Specifically, the controller 4 switches between the one of the first telephone book data memory region 6*a* and the second telephone book data memory region 6*b* as an object for the telephone book data transfer process and the other of the first telephone book data memory region 6a and the second telephone book data memory region 6b as an object for the telephone book data utilizing process. Thus, the controller 4 sets the one of the first telephone book data memory region 6a and the second telephone book data memory region 6b, in which the latest telephone book data transferred from the cell phone 3 is stored, as an object for the telephone book data utilizing process. Further, the controller 4 sets the other of the first telephone book data memory region 6a and the second telephone book data memory region 6b, which has been set as an object for the telephone book data utilizing process, as an object of the telephone book data transfer process.

When the controller 4 determines in step S14 that the display element 16 displays the outgoing call receiver information undetermined screen image at the time just after the controller 4 completes the telephone book data transfer process, i.e., when the determinations in step S14 is "YES," it goes to step S17. In step S17, the controller 4 a telephone book data update process for updating the telephone book data. Then, the controller 4 determines in step S18 whether it is necessary to update the outgoing call receiver information undetermined screen image at that time. When the controller 4 determines in step S18 that it is not necessary to update the outgoing call receiver information undetermined screen image at that time, i.e., when the determination in step S18 is "NO," the controller 4 completes the telephone book data transfer monitoring process, and returns to the main process.

Figure 7A:
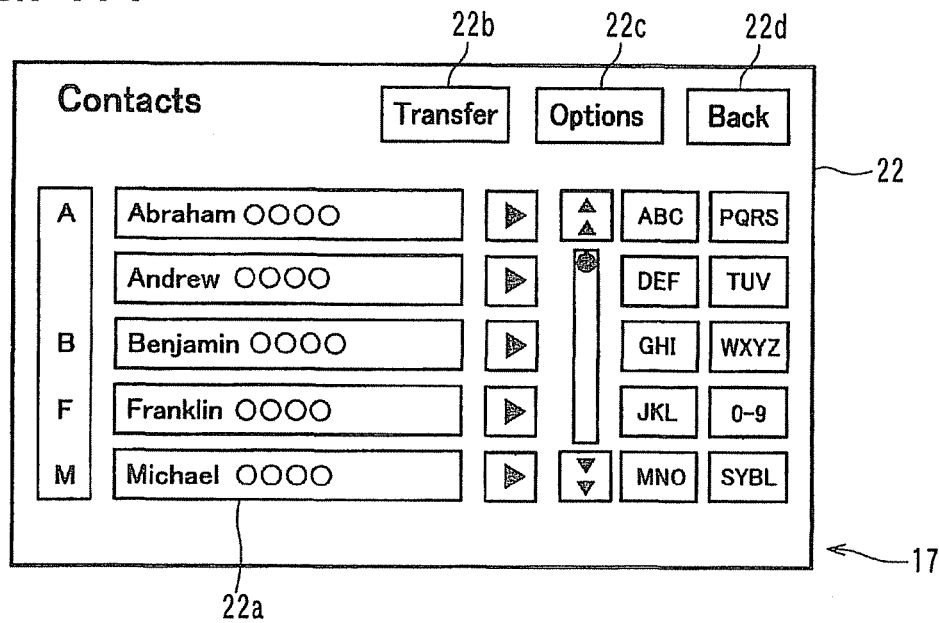
FIG. 7A is a diagram showing a telephone book data list screen image.
Figure 7B:
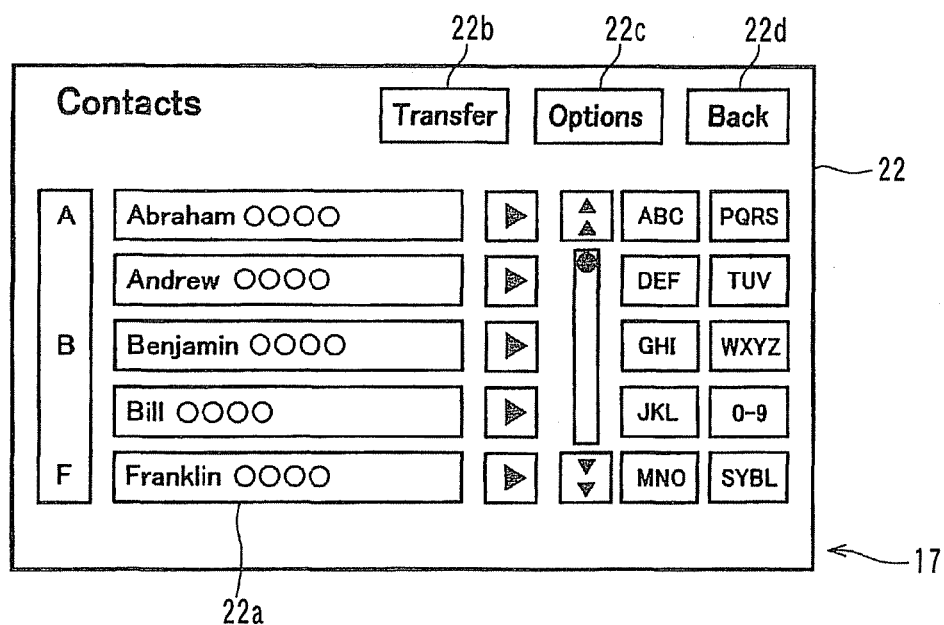
FIG. 7B is a diagram showing an updated telephone book data list screen image.

When the controller 4 determines in step S18 that it is necessary to update the outgoing call receiver information undetermined screen image at that time, i.e., when the determination in step S18 is "YES," it goes to step S19. On step S19, the controller 4 updates the outgoing call receiver information undetermined screen image displayed at that time based on the latest telephone book data transferred from the cell phone 3. Then, the controller 4 completes the telephone book data transfer monitoring process, and returns to the main process. Specifically, as shown in FIG. 7A, the controller 4 controls the display element 16 to display the telephone book data list screen image 22 in FIG. 2B. For example, when the new telephone book data relating to Bill is added in the latest telephone book data transferred from the cell phone 3, the controller 4 determines that it is necessary to update the outgoing call receiver information undetermined screen image at that time. Then, the controller 4 controls the display element 16 to display the updated telephone book data list screen image 22 in FIG. 7B according to the latest telephone book data transferred from the cell phone 3. Thus, the controller 4 updates the telephone book data list screen image 22.

When the controller 4 determines in step S15 that the display element 16 displays the outgoing call receiver information determined screen image at the time just after the controller 4 completes the telephone book data transfer process, i.e., when the determinations in step S15 is "YES," it goes to step S20. In step S20, the controller sets a not-updating flag to be "1" without performing the telephone book data update process at the time just after the controller 4 completes the telephone book data transfer process. The not-updating flag defines whether the controller 4 executes the telephone book data update process after the controller 4 completes the telephone book data transfer process. The not-updating flag of "1" represents a fact that the controller 4 has not executed the telephone book data update process although the controller 4 executes the telephone book data transfer process. Then, the controller 4 ends the telephone book data transfer monitoring process, and returns to the main process.

(2) Telephone Book Data Update Monitoring Process

The controller 4 starts to execute the telephone book data update monitoring process at certain time when the main process is moved to the telephone book data update monitoring process. When the controller 4 starts to execute the telephone book data update monitoring process, the controller 4 determines in step S21 whether the not-updating flag is "1." When the controller 4 determines that the not-updating flag is "1," i.e., when the controller 4 determines that the controller 4 does not execute the telephone book data update process although the controller 4 executes the telephone book data transfer process (i.e., the determination in step S21 is "YES"), the controller 4 determines in step S22 whether the display element 16 displays the outgoing call receiver information undetermined screen image.

When the controller 4 determines that the display element 16 displays the outgoing call receiver information determined screen image, i.e., when the determination in step S22 is "YES," the controller 4 ends the telephone book data update monitoring process without performing the telephone book data update process for updating the telephone book data, and returns to the main process.

When the controller 4 determines that the display element 16 does not display the outgoing call receiver information determined screen image, i.e., when the controller 4 determines that the display element 16 completes to display the outgoing call receiver information determined screen image (i.e., when the determination in step S22 is "NO"), it goes to step S23. In step S23, the controller 4 executes the telephone book data update process for updating the telephone book data. Then, in step S24, the controller 4 sets the not-updating flag to "0." Here, the not-updating flag of "0" represents a fact that the controller 4 has executed the telephone book data update process. Then, the controller 4 ends the telephone book data update monitoring process, and returns to the main process.

Thus, in the above construction, when the display element 16 displays the telephone book data list screen image 22 at the time just after the controller 4 completes the telephone book data transfer process, the controller 4 executes the telephone book data update process for switching between the one of the first telephone book data memory region 6a and the second telephone book data memory region 6b as an object for the telephone book data transfer process and the other of the first telephone book data memory region 6a and the second telephone book data memory region 6b as an object for the telephone book data utilizing process. Thus, the controller 4 controls the display element 16 to display the telephone book data list screen image 22 based on the latest telephone book data transferred from the cell phone 3.

When the display element 16 displays the telephone book data list selection screen image 23 at the time just after the controller 4 completes the telephone book data transfer process, the controller 4 does not execute the telephone book data update process for switching between the one of the first telephone book data memory region 6a and the second telephone book data memory region 6b as an object for the telephone book data transfer process and the other of the first telephone book data memory region 6a and the second telephone book data memory region 6b as an object for the telephone book data utilizing process, but the controller 4 controls the display element 16 to continue displaying the telephone book data list selection screen image 23 based on the previous telephone book data, which is prior to the latest telephone book data transferred from the cell phone 3. After the telephone book data list selection screen image 23 is cleared, the controller 4 executes the telephone book data update process. For example, when the user pushes the back keypad 23*d* in the telephone book data list selection screen image 23, the display element 16 displays the telephone book data list screen image 22 again, so that the telephone book data list selection screen image 23 is cleared. In this case, the controller 4 executes the telephone book data update process.

Thus, in the above embodiment, the in-vehicle device 2 includes the first telephone book data memory region 6*a* and the second telephone book data memory region 6*b*. The device 2 controls and manages one of the first telephone book data memory region 6*a* and the second telephone book data memory region 6*b* as an object for the telephone book data transfer process, and controls the other of the first telephone book data memory region 6*a* and the second telephone book data memory region 6*b* as an object for the telephone book data utilizing process so that the device 2 controls the first telephone book data memory region 6*a* and the second telephone book data memory region 6*b*, exclusively and independently. While the device 2 is storing the telephone book data transferred from the cell phone 3 in the one of the first telephone book data memory region 6*a* and the second telephone book data memory region 6*b* as an object of the telephone book data transfer process, the device 2 can utilize the telephone book data stored in the other of the first telephone book data memory region 6*a* and the second telephone book data memory region 6*b* as an object for the telephone book data utilizing process. Accordingly, even when the device 2 is executing the telephone book data transfer process, the user can browse the telephone book data, perform the calling operation with using the telephone book data, and recognize the incoming caller information based on the telephone book data. Thus, the operability of the device 2 is improved.

Further, when the display element 16 displays the telephone book data list screen image 22 at the time just after the controller 4 completes the telephone book data transfer process, the controller 4 executes the telephone book data update process at that time so that the display element 16 displays the telephone book data list screen image 22 based on the latest telephone book data transferred from the cell phone 3. Thus, the device 2 confirms the incoming caller information after the device 2 refers to the latest telephone book data transferred from the cell phone 3.

When the display element 16 displays the telephone book data list selection screen image 23 at the time just after the controller 4 completes the telephone book data transfer process, the controller 4 does not execute the telephone book data update process at that time. Instead, the controller 4 controls the display element 16 to continue displaying the telephone book data list selection screen image 23 based on the previous telephone book data, which is prior to the latest telephone book data transferred from the cell phone 3. Thus, for example, when the user confirms the outgoing call receiver information once, the device 2 does not delete the confirmed outgoing call receiver information without operation of the user. Thus, the user can make a phone call to the confirmed outgoing call receiver surely.

When the in-vehicle device communicates with the cell phone in a short range wireless communication manner, and the in-vehicle device obtains and stores the telephone book data transferred from the cell phone, the in-vehicle device may be a navigation device having a navigation function.

When the cell phone communicates with the in-vehicle device in a short range wireless communication manner, and the cell phone transfers the telephone book data to the in-vehicle device, the cell phone may be a portable information terminal.

In the above embodiment, the in-vehicle device and the cell phone communicate with each other via the BT communication method. Alternatively, the in-vehicle device and the cell phone may communicate with each other via other short range wireless communication methods.

The in-vehicle device 2 provides a telephone book data processor, the cell phone 3 provides an external device, the controller 4 provides a control element and an incoming call detection element, the BT communication unit 5 provides a connection element and a telephone book data obtaining element, the memory 6 provides a telephone book data memory, the operation input unit 9 provides a browsing operation input element and an outgoing call operation input element, the display element 16 provides a telephone book data display element, a caller information display element, an outgoing call receiver information undetermined screen display element and an outgoing call receiver information determined screen display element.

The above disclosure has the following aspects.

According to an aspect of the present disclosure, a telephone book data processor includes: a connection element for connecting to an external device via a short range communication manner so as to provide a telephone book data transfer protocol for transferring a telephone book data from the external device to the telephone book data processor; a telephone book data obtaining element for obtaining the telephone book data when the connection element is connected to the external device; a telephone book data memory for storing the telephone book data; and a controller for executing a telephone book data transfer process and a telephone book data utilizing process for utilizing the telephone book data in the telephone book data memory, wherein the controller controls the connection element to connect to the external device, controls the telephone book data obtaining element to obtain the telephone book data, and controls the telephone book data memory to store the telephone book data in the telephone book data transfer process. The telephone book data memory includes a plurality of telephone book data memory regions. Each of the plurality of telephone book data memory regions stores the telephone book data, which is transferred from the external device at one time. The controller defines one of the plurality of telephone book data memory regions as an object of the telephone book data transfer process and another one of the plurality of telephone book data memory regions as an object of the telephone book data utilizing process. The controller executes the telephone book data utilizing process with using the telephone book data stored in the another one of the plurality of telephone book data memory regions while the controller executes the telephone book data transfer process for storing a new telephone book data from the telephone book data obtaining element in the one of the plurality of telephone book data memory regions.

In the above processor, the controller can execute the telephone book data transfer process and the telephone book data utilizing process independently. Even when the processor executes the telephone book data transfer process for obtaining and storing the new telephone book data transferred from the external device, the processor can execute the telephone book data utilizing process for utilizing the telephone book data. Thus, the operability of the processor is improved.

Alternatively, the telephone book data processor may further include: a browsing operation input element for receiving a browsing operation of the telephone book data input from a user; and a telephone book data display. In telephone book data utilizing process, the controller controls the telephone book data display to display the telephone book data stored in the another one of the plurality of telephone book data memory regions when the browsing operation input element receives the browsing operation. In this case, even when the processor executes the telephone book data transfer process for obtaining and storing the new telephone book data transferred from the external device, the user can browse the telephone book data.

Alternatively, the telephone book data processor may further include: a calling operation input element for receiving a calling operation of a user. In telephone book data utilizing process, the controller controls the external device to make a phone call with using the telephone book data stored in the another one of the plurality of telephone book data memory regions when the calling operation input element receives the calling operation. In this case, even when the processor executes the telephone book data transfer process for obtaining and storing the new telephone book data transferred from the external device, the user can make a phone call with using the telephone book data.

Alternatively, the telephone book data processor may further include: an incoming call detection element for detecting an incoming call of the external device; and a caller information display. In telephone book data utilizing process, the controller controls the caller information display to display caller information based on the telephone book data stored in the another one of the plurality of telephone book data memory regions when the incoming call detection element detects the incoming call. In this case, even when the processor executes the telephone book data transfer process for obtaining and storing the new telephone book data transferred from the external device, the user can recognize the caller information based on the telephone book data on the caller information display in a case where the external device receives the incoming call.

Alternatively, the telephone book data processor may further include: an outgoing call receiver information undetermined screen display. The controller switches between the one of the plurality of telephone book data memory regions and the another one of the plurality of telephone book data memory regions so that the controller controls the outgoing call receiver information undetermined screen display to display the new telephone book data stored in the one of the plurality of telephone book data memory regions when the controller completes the telephone book data transfer process under a condition that the outgoing call receiver information undetermined screen display displays an outgoing call receiver information undetermined screen image based on the telephone book data stored in the another one of the plurality of telephone book data memory regions. In this case, when the processor completes the telephone book data transfer process under a condition that the outgoing call receiver information undetermined screen display displays the outgoing call receiver information undetermined screen image, the outgoing call receiver information undetermined screen display displays the new telephone book data stored in the one of the plurality of telephone book data memory regions. Thus, the user can determine the outgoing call receiver with referring to the new telephone book data, which is transferred from the external device.

Alternatively, the telephone book data processor may further include: an outgoing call receiver information determined screen display. The controller controls the outgoing call receiver information determined screen display to continue displaying the telephone book data stored in the another one of the plurality of telephone book data memory regions without switching between the one of the plurality of telephone book data memory regions and the another one of the plurality of telephone book data memory regions when the controller completes the telephone book data transfer process under a condition that the outgoing call receiver information determined screen display displays an outgoing call receiver information determined screen image based on the telephone book data stored in the another one of the plurality of telephone book data memory regions. In this case, when the controller completes the telephone book data transfer process under a condition that the outgoing call receiver information determined screen display displays the outgoing call receiver information determined screen image, the outgoing call receiver information determined screen display continues displaying the telephone book data. Thus, for example, the user can surely make a phone call to the outgoing call receiver, which has been determined by the user. Therefore, the processor does not delete the determined outgoing call receiver information without operation of the user.

Further, the controller may switch between the one of the plurality of telephone book data memory regions and the another one of the plurality of telephone book data memory regions after the controller controls the outgoing call receiver information determined screen display to clear the outgoing call receiver information determined screen image. Thus, after the controller controls the outgoing call receiver information determined screen display to clear the outgoing call receiver information determined screen image, the user can utilize the new telephone book data, which is stored in the one of the plurality of telephone book data memory regions.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A telephone book data processor comprising:
   a connection element for connecting to an external device via a short range communication manner so as to provide a telephone book data transfer protocol for transferring a telephone book data from the external device to the telephone book data processor;
   a telephone book data obtaining element for obtaining the telephone book data when the connection element is connected to the external device;
   a telephone book data memory for storing the telephone book data;
   a controller for executing a telephone book data transfer process and a telephone book data utilizing process for utilizing the telephone book data in the telephone book data memory, wherein the controller controls the connection element to connect to the external device, controls the telephone book data obtaining element to obtain the telephone book data, and controls the telephone book data memory to store the telephone book data in the telephone book data transfer process, and
   an outgoing call receiver information determined screen display,
   wherein the telephone book data memory includes a plurality of telephone book data memory regions,
   wherein each of the plurality of telephone book data memory regions stores the telephone book data, which is transferred from the external device at one time,
   wherein the controller defines one of the plurality of telephone book data memory regions as an object of the telephone book data transfer process and another one of the plurality of telephone book data memory regions as an object of the telephone book data utilizing process, wherein the controller executes the telephone book data utilizing process using the telephone book data stored in the another one of the plurality of telephone book data memory regions while the controller simultaneously executes the telephone book data transfer process for storing a new telephone book data from the telephone book data obtaining element in the one of the plurality of telephone book data memory regions, and wherein the controller controls the outgoing call receiver information determined screen display to continue displaying the telephone book data stored in the another one of the plurality of telephone book data memory regions without switching between the one of the plurality of telephone book data memory regions and the another one of the plurality of telephone book data memory regions when the controller completes the telephone book data transfer process under a condition that the outgoing call receiver information determined screen display displays an outgoing call receiver information determined screen image based on the telephone book data stored in the another one of the plurality of telephone book data memory regions.

2. The telephone book data processor according to claim 1, further comprising:

a browsing operation input element for receiving a browsing operation of the telephone book data input from an user; and a telephone book data display, wherein, in telephone book data utilizing process, the controller controls the telephone book data display to display the telephone book data stored in the another one of the plurality of telephone book data memory regions when the browsing operation input element receives the browsing operation.

3. The telephone book data processor according to claim 1, further comprising:

a calling operation input element for receiving a calling operation of an user, wherein, in telephone book data utilizing process, the controller controls the external device to make a phone call with using the telephone book data stored in the another one of the plurality of telephone book data memory regions when the calling operation input element receives the calling operation.

4. The telephone book data processor according to claim 1, further comprising:

an incoming call detection element for detecting an incoming call of the external device; and a caller information display, wherein, in telephone book data utilizing process, the controller controls the caller information display to display caller information based on the telephone book data stored in the another one of the plurality of telephone book data memory regions when the incoming call detection element detects the incoming call.

5. The telephone book data processor according to claim 1, further comprising:

an outgoing call receiver information undetermined screen display, wherein the controller switches between the one of the plurality of telephone book data memory regions and the another one of the plurality of telephone book data memory regions so that the controller controls the outgoing call receiver information undetermined screen display to display the new telephone book data stored in the one of the plurality of telephone book data memory regions when the controller completes the telephone book data transfer process under a condition that the outgoing call receiver information undetermined screen display displays an outgoing call receiver information undetermined screen image based on the telephone book data stored in the another one of the plurality of telephone book data memory regions.

6. The telephone book data processor according to claim 1, wherein the controller switches between the one of the plurality of telephone book data memory regions and the another one of the plurality of telephone book data memory regions after the controller controls the outgoing call receiver information determined screen display to clear the outgoing call receiver information determined screen image.

* * * * *